US007120678B2

(12) United States Patent
Greuel

(10) Patent No.: US 7,120,678 B2
(45) Date of Patent: Oct. 10, 2006

(54) METHOD AND APPARATUS FOR CONFIGURABLE DATA COLLECTION ON A COMPUTER NETWORK

(75) Inventor: James R. Greuel, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 09/794,376

(22) Filed: Feb. 27, 2001

(65) Prior Publication Data

US 2002/0161861 A1 Oct. 31, 2002

(51) Int. Cl.
*G06F 15/177* (2006.01)
*G06F 7/00* (2006.01)

(52) U.S. Cl. .......................... 709/220; 707/1
(58) Field of Classification Search ................ 709/208, 709/211, 220, 223, 224, 225, 229, 244; 707/1
See application file for complete search history.

(56) References Cited

U.S. PATENT DOCUMENTS

| | | | |
|---|---|---|---|
| 5,097,469 A | 3/1992 | Douglas | 371/20.1 |
| 5,546,540 A | 8/1996 | White | 395/200.1 |
| 5,615,323 A | 3/1997 | Engel et al. | 395/140 |
| 5,719,882 A | 2/1998 | Ellis | 371/33 |
| 5,886,643 A | 3/1999 | Diebboll et al. | 340/825.08 |
| 5,983,269 A * | 11/1999 | Mattson et al. | 709/221 |
| 6,003,077 A | 12/1999 | Bawden et al. | 709/223 |
| 6,032,183 A | 2/2000 | Chen et al. | 709/223 |
| 6,055,493 A * | 4/2000 | Ries et al. | 702/186 |
| 6,111,561 A | 8/2000 | Brandau et al. | 345/121 |
| 6,115,393 A | 9/2000 | Engel et al. | 370/469 |
| 6,148,337 A * | 11/2000 | Estberg et al. | 709/224 |
| 6,252,858 B1 * | 6/2001 | Inoue | 370/254 |
| 6,327,677 B1 * | 12/2001 | Garg et al. | 714/37 |

(Continued)

OTHER PUBLICATIONS

"Reporting and Data Analysis with HP OpenView Network Node Manager",Rev. 1, Hewlett-Packard, Nov. 1999, Chapter 5, pp. 87-98.

(Continued)

*Primary Examiner*—John Follansbee
*Assistant Examiner*—J. Bret Dennison

(57) ABSTRACT

The invention facilitates improved configuration of computer network data collection. In one respect, the invention is a method for determining a network data collection configuration for an entity utilizing a computer network. The method determines which nodes in the network are associated with the entity, reads a view definition associated with the entity and determines which network variables are components of the health score, selects from the nodes associated with the entity those nodes that are components of the view, and produces a configuration file that specifies the network variables for each corresponding selected node. The data collection preferably utilizes the SNMP protocol. The determining step preferably queries a database that stores entity-node associations. The view definition is preferably an XML file and refers to all nodes of a particular device type, so that the selecting step can filter network nodes by device type. In a preferred form, the network is the Internet, the method is performed by an Internet service provider, and the entity is a customer of the Internet service provider. Optionally, the method reads and utilizes a template for the configuration file. In another respect, the invention is an apparatus. The apparatus comprises a first database that stores entity-node associations, a view definition associated with an entity, a second database that stores node device type information, and a network data collection configuration generation tool, connected to the above. The network data collection configuration generation tool generates a network data collection configuration file customized to the view definition.

38 Claims, 2 Drawing Sheets

U.S. PATENT DOCUMENTS

| | | | |
|---|---|---|---|
| 6,339,789 B1 * | 1/2002 | Sugauchi et al. | 709/223 |
| 6,502,132 B1 * | 12/2002 | Kumano et al. | 709/224 |
| 6,594,695 B1 * | 7/2003 | Vasamsetti et al. | 709/220 |
| 6,647,410 B1 * | 11/2003 | Scimone et al. | 709/206 |
| 6,671,730 B1 * | 12/2003 | Akatsu et al. | 709/228 |

OTHER PUBLICATIONS

Andrix, Beth, "Concord Unveils New eHealth Strategy and Solution" [online], Jan. 17, 2000, [retrieved on Jan. 11, 2001]. Retrieved from the Internet: <URL: http://www.concord.com/corp/media/uspress/ccdocrytk3c.html>.

Zeichick, Alan, "Predicting Failure" [online], Aug. 30, 2000, [retrieved on Jan. 11, 2001]. Retrieved from the Internet: <http://www.concord.com/products/inother/ccd5p2yikcc.html.

"Concord Adds Fault Diagnosis, Proactive Management And Capacity Planning Capabilities to HP OpenView", Nov. 8, 2000, US Press Release [online]. Concord Communications. [Retrieved on Jan. 11, 2001] Retrieved from the Internet: <URL: http://www.concord.com/products/inother/ccdkzxf7bfc.html.

Frequently AskQuestions. Reporting [online]. Concord Communications. [retrieved on Jan. 11, 2001]. Retrieved from the Internet: <URL: http://www.concord.com/products/faqs/report.htm.

Frequently AskQuestions. Network Health [online]. Concord Communications. [retrieved on Jan. 11, 2001]. Retrieved from the Internet: <URL: http://www.concord.com/products/faqs/market.htm.

Network Health [online]. Concord Communications. [retrieved on Jan. 11, 2001]. Retrieved from the Internet: <URL: http://www.concord.com/products/ehealth/nethealth/network.htm>.

* cited by examiner

METHOD AND APPARATUS FOR CONFIGURABLE DATA COLLECTION ON A COMPUTER NETWORK

FIELD OF THE INVENTION

This invention relates generally to computer networks and more particularly to computer network monitoring.

BACKGROUND OF THE INVENTION

The Simple Network Management Protocol (SNMP) originated as a means for managing TCP/IP (Transmission Control Protocol/Internet Protocol) and Ethernet networks. Today, SNMP is a generally accepted standard for monitoring and control of heterogeneous networks. Using SNMP, network administrators can address queries and commands to network nodes and devices. SNMP monitors network performance and status; controls operational parameters; and reports, analyzes and isolates faults. The protocol accomplishes these functions by transporting management information between "managers" and "agents."

An agent is a component housed within a managed network device such as a router, gateway, or server. Each agent stores management data and responds to the manager's requests for this data, and may send a "trap," a special unsolicited SNMP message, to the manager after sensing a prespecified condition. A manager is a component housed within a network management station. The manager queries and controls agents using various SNMP commands, which are transported as Protocol Data Units (PDUs). Five SNMP commands are defined in SNMP version 1: GetRequest, GetNextRequest, SetRequest, GetResponse and Trap. Agents inspect and retrieve the management data after receiving either a GetRequest or a GetNextRequest PDU from a manager. Managers use GetRequest for retrieving single values of the managed objects. The GetNextRequest is issued by the manager to begin a primitive block transfer and the agent returns the selected data with a GetResponse PDU. Managers use SetRequest commands for instructing agents to alter variables.

SNMP utilizes a virtual information store (e.g., an object database) that is referred to as Management Information Base (MIB). The MIB store is accessible to agents and manipulated via SNMP for network management. A MIB data structure defines a device's observable (e.g., discoverable or collectible) variables and controllable parameters. A router MIB, for example, may contain fields for CPU utilization, up/down status for each interface, error rates on interfaces, congestion metrics (e.g., buffer levels, latency or packet discard rates) and the like.

The manager is charged with, among other things, monitoring network performance and status, controlling operational parameters, and reporting, analyzing and isolating faults in its managed domain. A good example of an SNMP network management station (and hence a manager) is Hewlett-Packard's Network Node Manager (NNM) product.

Another protocol for network performance monitoring and troubleshooting is ICMP (Internet Control Message Protocol). The ICMP protocol supports ping or echo messages, which are round-trip messages to a particular addressed network device and then back to the originator. By issuing a ping to a network device, a manager can determine whether the network device is online or offline (i.e., up or down) on the basis of whether the ping message is returned to the manager. Because the ICMP protocol or other ping messages are universally supported, the manager can in this way determine the most important piece of status information (i.e., up/down status) for network devices that do not support the SNMP protocol.

A manager can be directed to collect specific network data via SNMP or ICMP. In other words, a manager can be directed to issue certain GetRequest or GetNextRequest commands to a particular agent. Typically, these directions are contained in a data collection configuration file, which specifies the nodes and MIB variables to request as well as when to make the request.

Data collection configuration files can be prepared manually, but manual preparation is disadvantageous in several respects. Manual configuration is time consuming and error prone. The disadvantages are compound when the data collector is a network provider, who provides networks and/or network services to its customers, such as a on-line service provider (OSP), Internet service provider (ISP) or company's own IT (information technology) group (whose "customers" are other groups of the same company). Any time a new customer is added, a customer removed, service expanded, or performance metric changed, a new or different data collection configuration is likely needed. It is unlikely that a network administrator would always remember to perform the configuration change—much less always perform the change correctly.

Automatic data collection configuration is better. A version of Hewlett-Packard's NNM provided automatic SNMP data collector configuration. Though providing some improvement over purely manual configuration, the automatic configuration feature of this product was suboptimal. In particular, automatic configuration was limited to a fixed set of SNMP metrics and did not support a customer model or unique or flexible sets of SNMP variables. In addition, its support of device type filtering was very limited. That is, one could not conveniently configure data collection from all of particular type of device (e.g., all servers or all routers). Furthermore, one could not conveniently configure data collection based on a customer-to-node mapping.

SUMMARY OF THE INVENTION

The invention facilitates improved configuration of computer network data collection.

In one respect, the invention is a method for determining a network data collection configuration for an entity utilizing a computer network. The method determines which nodes in the network are associated with the entity, reads a view definition associated with the entity and determines which network variables are components of the customer view, selects from the nodes associated with the entity those nodes that are components of the view, and produces a configuration file that specifies the network variables for each corresponding selected node. The data collection preferably utilizes the SNMP protocol. The determining step preferably queries a database that stores entity-node associations. The view definition is preferably an XML (extensible markup language) file and refers to all nodes of a particular device type, so that the selecting step can filter network nodes by device type. In a preferred form, the network is the Internet, the method is performed by an Internet service provider, and the entity is a customer of the Internet service provider. Optionally, the method reads and utilizes a template for the configuration file.

In another respect, the invention is computer readable media on which is embedded a program that performs the above method.

In yet another respect, the invention is an apparatus. The apparatus comprises a first database that stores entity-node associations, a view definition associated with an entity, a second database that stores node device type information, and a network data collection configuration generation tool, connected to the above. The network data collection configuration generation tool generates a network data collection configuration file customized to the view definition. The data collection preferably utilizes the SNMP protocol. Optionally, the view definition associated with the entity comprises an expression defined in a second view definition. Optionally, the apparatus also includes a template network data collection configuration file.

In comparison to known prior art, certain embodiments of the invention are capable of achieving certain advantages, including some or all of the following: (1) data collection configuration can be customized more easily; (2) customer models are better supported; and (3) improved device type filtering is provided. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

An embodiment of the invention is explained below in the context of a customer model, because the embodiment is naturally suited to the customer model. According to this model, a service provider (e.g., OSP, ISP or company IT group) provides a computer network or part thereof and/or network services (e.g., Internet access or application hosting) for use by a customer of the service provider. The customer may be, for example, a web site host. Typically, a service provider has multiple customers. Each customer is understandably curious about its network or piece of the network. For example, each customer would like to have assurances that the service provider is providing adequate resources. Likely, each customer is curious about different aspects of the network. Although the embodiment of the invention is described with reference to "customers," the "customer" may be any entity.

Figure 1:
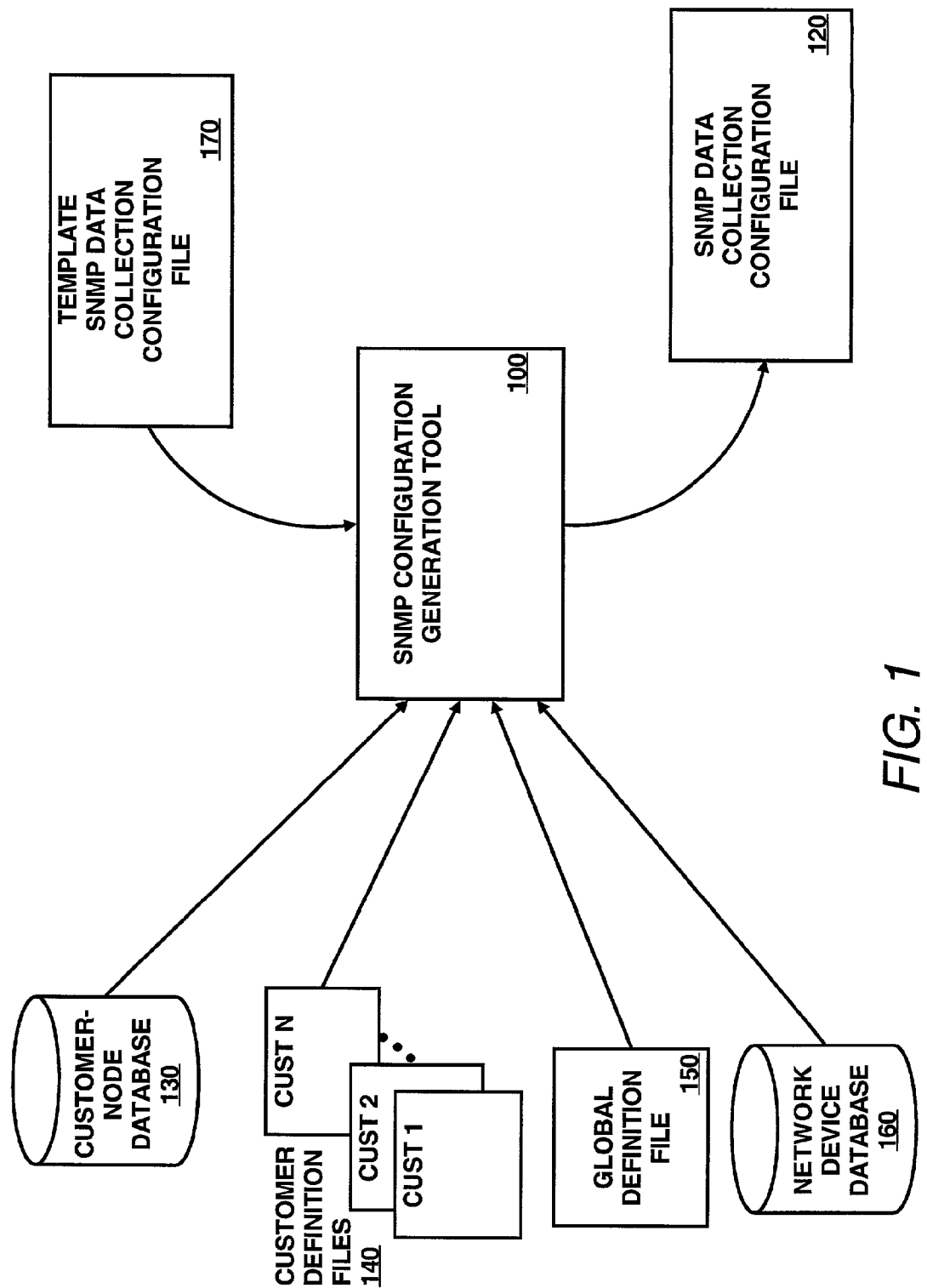
FIG. 1 is a block diagram of an apparatus and its environment, according to an embodiment of the invention.

FIG. 1 is a block diagram of an SNMP configuration generation tool 100 and its environment 110, according to an embodiment of the invention. The environment 110 includes several files and databases that are the inputs and output of the SNMP configuration generation tool 100. The final output of the SNMP configuration generation tool 100 is an SNMP data collection configuration file 120. The SNMP data collection configuration file 120 is input to an SNMP data collector (not shown). The SNMP configuration generation tool 100 produces the SNMP data collection configuration file 120 on the basis of input from a customer-node database 130, customer definition files 140, a global definition file 150, a network device database 160 and a template SNMP data collection configuration file 170.

The customer-node database 130 is a database that lists, for each customer, which nodes in the network are associated with that particular customer. As an example, the customer-node database 130 may contain the following information for a given customer:

Customer WingNuts-R-Us
   Nodes
      c8540csr.cnd.hp.com
      lcntp550.cnd.hp.com
      theforce.cnd.hp.com According to the above example entries, a customer named "WingNuts-R-Us" is associated with three network nodes. The nodes may be servers, routers or other types of network devices, as specified in the network device database 160, as explained below. What the customer wishes to observe about these nodes is specified in the customer definition files 140, next to be described.

The customer definition files 140 are files that contain high-level definitions of what aspects of the computer network the customer desires to view, such as, performance metrics. The customer definition files 140 are also referred to as view definition files. For example, the customer definition files 140 can contain health score definitions, such as the ones described in copending and commonly assigned U.S. patent application Ser. No. 09/764,563, entitled "Method and Apparatus for Customizably Calculating and Displaying Health of a Computer Network," which is hereby incorporated by reference. An illustrative definition found in the customer definition file 140 is a definition for router health as follows:

```
1 <!-- Definition for a "Router Health" gauge. -->
  <Summary title="Router Health">
      <Component weight="1" href="#IfHealth"/>
      <Component weight="1" href="#CiscoCpuUtil"/>
      <NodeSelection title="Routers">
          <CapabilityFilter>
              <Capability value="isRouter"/>
          </CapabilityFilter>
      </NodeSelection>
  </Summary>
```

This example entry defines a performance metric labeled "Router Health." As defined, Router Health is to be calculated based on two equally weighted components: interface health ("IfHealth") and CPU (central processing unit) utilization ("CiscoCpuUtil"). These components, and others that customers can utilize, are defined in the global definition file 150, as explained in detail below. The Router Health metric is applied to all nodes that are routers (i.e., for which "isRouter" is true), according to the network device database 160.

As can be seen from the example above, the preferred form of a customer definition file 140 is XML (extensible markup language). Each customer has its own customer definition file; this allows each customer to define its own view in a manner uniquely suitable to that customer. A customer definition file 140 contains information to identify the customer, such as the following:

```
<SecurityFilter>
    <CustomerFilter>
        <Customer name="WingNuts-R-Us"/>
    </CustomerFilter>
</SecurityFilter>
```

The global definition file 150 contains definitions for expressions that may appear in the customer definition files. The global definition file 150 is potentially referred to by all of the customer definition files 140. As an example, the following entry defines "CiscoCpuUtil," which is a measure of CPU utilization:

```
<Element id="CiscoCpuUtil" title="CPU Utilization
    Health"
    autoConfig="yes"
    href="snmp://%item%[0]/p_cisco5minavgbusy">
    <!—Maps utilization percentage to health scores 0–100
    —>
    <!—Note that higher utilization results in a lower
        score.—>
    <Scale lower="0" upper="60" translation="100"/>
    <Scale lower="60" upper="70" translation="75"/>
    <Scale lower="70" upper="80" translation="50"/>
    <Scale lower="80" upper="90" translation="25"/>
    <Scale lower="90" translation="0"/>
</Element>
```

This sample entry indicates that the data source is SNMP and, more specifically, the MIB variable p_cisco5minavgbusy (which is an alias for "cisco.local.lsystem.avgBusy5"). The "[0]" indicates that the SNMP instance value is zero. The "autoconfig" attribute would, if "no," cause the SNMP configuration generation tool 100 to ignore this element. The sample entry also includes a scale that maps ranges of the raw data value of the MIB variable into scores from zero to 100. Those skilled in the art realize that other forms of mappings (e.g., mathematical formulas) are possible.

The network device database 160 contains information about devices in the network. This information includes device type information, such as the following:

```
c8540csr.cnd.hp.com
    isRouter=true
    isServer=false
    isHub=false
    isKeyDevice=true
    isCPE=false
lcntp550.cnd.hp.com
    isRouter=true
    isServer=false
    isHub=false
    isKeyDevice=true
    isCPE=true
theforce.cnd.hp.com
    isRouter=false
    isServer=true
    isHub=false
    isKeyDevice=false
    isCPE=false
```

According to these sample entries, the devices whose domain name are c8540csr.cnd.hp.com and lcntp550.cnd.hp.com are routers and also designated as "Key Devices." The device at theforce.cnd.hp.com is a server. This information enables the SNMP configuration generation tool 100 to access all devices of a particular type easily and conveniently, as the example customer definition files 140 above demonstrates. The network device database 160 preferably also includes information about device interfaces (e.g., whether a given interface is "Key").

The template SNMP data collector configuration file 170 is the final input to the SNMP configuration generation tool 100 in the environment 110. The template file 170 is a starting point for constructing the SNMP data collector configuration file 120. An example entry is the template file 170 is the following:

```
MIB p_cisco5minavgbusy
    _NODE_ 900 _INSTANCE_
```

The expressions "_NODE_" and "_INSTANCE_" are placeholders that the SNMP configuration generation tool 100 overwrites with an actual node name (or address) and instance value. The term "900" is a default polling interval in seconds.

Continuing the above series of examples to fruition results in the following entry in the SNMP data collector configuration file 120:

```
MIB p_cisco5minavgbusy
    lcntp550.cnd.hp.com 900 0
    c8540csr.cnd.hp.com 900 0
```

This sample entry configures an SNMP data collector to collect values of the MIB variable p_cisco5minavgbusy from the two nodes named in the first column, with a polling frequency of 900 seconds and an instance value of 0 in both cases. Collection of these two MIB variables enables the CPU utilization component of the Router Health metric to be calculated.

Network changes can be tracked and reacted to with minimal effort in the environment 100. If a customer is removed or a new customer is added, then the customernode database 130 is simply changed accordingly. If devices are removed or new devices are added to the network, then the network device database 160 is changed accordingly. Expressions can be modified in the global definition file 150 without disturbing each of the customer definition files 140. Polling intervals can also be adjusted globally by modification to the template file 170.

Although the embodiment illustrated in FIG. 1 has been described with reference to SNMP, the invention contemplates any type of computer network data collection protocol. One illustrative protocol other than SNMP is ICMP.

Figure 2:
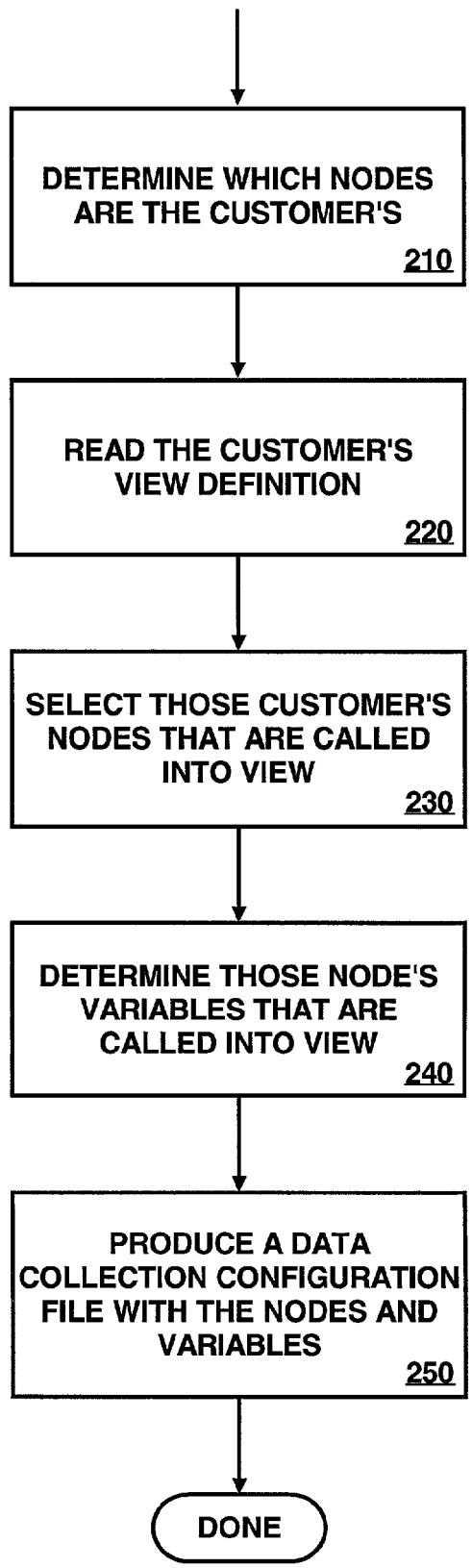
FIG. 2 is a flowchart of a method, according to an embodiment of the invention.

FIG. 2 is a flowchart of a method 200 according to an embodiment of the invention. The method 200 produces the data collection configuration file 120. The method 200 is performed by the configuration generation tool 100. The method 200 determines (210) which nodes are associated with the customer. Preferably, the determination step 210 is performed by querying the customer-node database 130. The method 200 reads (220) the customer's view definition. Preferably, the view definition is an XML file that defines customized network health scores that the customer wishes to view, like the customer definition files 140. The view definition may be independent and self-contained, or it may refer to expressions defined elsewhere, such as the global definition file 150. The method 200 next selects (230) those nodes associated with the customer that are called into view and determines (240) those node's variables that are called into view. Finally, the method 200 produces a data collection configuration file with the nodes and variables determined in the steps 230 and 240. The production step 250 can be performed with or without the aid of a preexisting template file.

The steps of the method 200 can be performed in an order different from that illustrated in FIG. 2, as one skilled in the art readily appreciates. Furthermore, certain steps of the method 200 can be performed simultaneously in parallel. For example, the determining step 210 and the reading step 220 are not sequentially dependent and can be performed concurrently.

The method 200 can be performed by a computer program. That is, the SNMP configuration generation tool 100 can be a computer program. The computer program can exist in a variety of forms both active and inactive. For example, the computer program and objects can exist as software comprised of program instructions or statements in source code, object code, executable code or other formats; firmware program(s); or hardware description language (HDL) files. Any of the above can be embodied on a computer readable medium, which include tangible storage devices and intangible signals, in compressed or uncompressed form. Exemplary tangible computer readable storage devices include conventional computer system RAM (random access memory), ROM (read only memory), EPROM (erasable, programmable ROM), EEPROM (electrically erasable, programmable ROM), and magnetic or optical disks or tapes. Exemplary intangible computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. For example, the score calculated and output by the invention need not be a "health" score, and the score need not be a composite formed from two or more system variables, but may be a score derived from a mapping of a single system variable. Those skilled in the art will recognize that these and many other variations are possible within the spirit and scope of the invention, which is intended to be defined by the following claims—and their equivalents—in which all terms are meant in their broadest reasonable sense unless otherwise indicated.

What is claimed is:

1. An apparatus comprising:
   a first database that stores information identifying which of one or more nodes in a network are associated with each of a plurality of customers;
   a plurality of customer-defined view definition files each containing at least one definition of an aspect of the network to be viewed by a corresponding customer, wherein at least one of the at least one definition defines a calculation based on at least one component, and wherein at least one of the at least one component defines a function involving collecting data associated with at least one network variable from at least one of said one or more nodes associated with the corresponding customer;
   a second database that stores device-type information for nodes on the network; and
   a configuration generation tool operable to generate a network data collection configuration file customized to one of said customer-defined view definition files based on information received from said first and second databases, wherein the generated network data collection configuration file is usable in directing a network data collector to collect network data in accordance with the customer-defined view definition file.

2. The apparatus of claim 1, wherein the customer is an entity.

3. The apparatus of claim 1, wherein said at least one definition defines at least one performance metric of said at least one node associated with said corresponding customer.

4. The apparatus of claim 1, wherein said plurality of customer-defined view definition files comprise extensible markup language (XML) formatted view definition files.

5. The apparatus of claim 1, further comprising:
   a global definition file that stores definitions for at least one of said at least one component of said at least one customer-defined view definition file, wherein said configuration generation tool generates said network data collection configuration file further also based on information received from said global definition file.

6. The apparatus of claim 5, wherein said at least one definition stored in said global definition file comprise at least one mapping.

7. The apparatus of claim 1, wherein each of said plurality of customer-defined view definition files further comprises an identity of said corresponding customer.

8. The apparatus of claim 1, wherein said network data collection configuration file is a Simple Network Management Protocol (SNMP) data collection configuration file.

9. The apparatus of claim 1, further comprising:
   a template file that stores at least one network data collection configuration file template usable by said configuration generation tool to generate said network data collection configuration file.

10. The apparatus of claim 1, wherein at least one of said at least one component of said plurality of customer-defined view definition files is independent and self-contained.

11. The apparatus of claim 1, wherein at least one of said at least one component of said plurality of customer-defined view definition files is defined in a file other than the plurality of customer-defined view definition files.

12. The apparatus of claim 9, wherein said template file stores with said at least one network data collection configuration file template a polling frequency at which the network data collector is to access said nodes associated with the corresponding customer for values of said at least one network variable.

13. The apparatus of claim 12, wherein the network is the Internet, and wherein said configuration generation tool is controlled by a network provider which provides networks or network services to a customer of the network provider.

14. The apparatus of claim 13, wherein said network provider is an Internet service provider (ISP), and the customer is a customer of the ISP.

15. The apparatus of claim 13, wherein said network provider is an on-line service provider (OSP), and the customer is a customer of the OSP.

16. A method comprising:
   determining which one or more nodes in a network are associated with a corresponding customer;
   reading a customer-defined view definition file containing at least one definition of an aspect of the network to be viewed by the corresponding customer, wherein at least one of the at least one definition defines a calculation based on at least one component, and wherein at least one of the at least one component defines an expression involving collecting data associated with at least one network variable from at least one node associated with said corresponding customer;
   deriving from the nodes associated with the corresponding customer, values for said at least one network variable referenced in the said customer-defined view definition file; and generating a network data collection configuration file customized to said customer-defined view definition file based on said at least one network variable derived from said nodes associated with the corresponding customer, wherein the generated network data configuration file is usable in directing a network data collector to collect network data in accordance with the customer-defined view definition file.

17. The method of claim 16, wherein determining which nodes in the network are associated with the corresponding customer comprises: querying a customer-node database that stores information identifying which nodes in the network are associated with each of a plurality of customers for said node associated with said corresponding customer.

18. The method of claim 16, wherein deriving said at least one network variable comprises: deriving from the nodes associated with the corresponding customer said at least one network variable referenced in said customer-defined view definition file based on information received from a network device database that stores device-type information for nodes on the network.

19. The method of claim 16, wherein the customer is an entity.

20. The method of claim 16, wherein said at least one definition defines at least one performance metric of said at least one node associated with said corresponding customer.

21. The method of claim 16, wherein said plurality of customer-defined view definition files comprise extensible markup language (XML) formatted view definition files.

22. The method of claim 16, further comprising:
providing a global definition file that stores definitions for at least one of said at least one component of said at least one customer-defined view definition file, and wherein generating said network data collection configuration file further comprises:
receiving said definition for at least one of said at least one component from said global definition file.

23. The method of claim 16, wherein each of said plurality of customer-defined view definition files further comprises an identity of said corresponding customer.

24. The method of claim 16, wherein said network data collection configuration file is a Simple Network Management Protocol (SNMP) data collection configuration file.

25. The method of claim 16, further comprising:
providing a template file that stores at least one network data collection configuration file template; and
receiving from said template file a network data collection configuration file template; and
using said received template to generate said network data collection configuration file.

26. The method of claim 16, wherein at least one of said at least one component of said plurality of customer-defined view definition files are independent and self-contained.

27. The method of claim 16, wherein the network is the Internet and wherein said configuration generation tool is controlled by a network provider which provides networks or network services to a customer of the network provider.

28. The method of claim 27, wherein said network provider is an Internet service provider (ISP), and the customer is a customer of the ISP.

29. The method of claim 27, wherein said network provider is an on-line service provider (OSP), and the customer is a customer of the OSP.

30. A computer-readable storage medium on which is embedded a program, the program capable of performing a method comprising:
determining which of one or more nodes in a network are associated with a corresponding customer;
reading a customer-defined view definition file containing at least one definition of an aspect of the network to be viewed by a corresponding customer, wherein at least one of the at least one definition defines a calculation based on at least one component, and
wherein each of the at least one component defines a function involving collecting data associated with at least one network variable from at least one node associated with said corresponding customer;
deriving from the nodes associated with the corresponding customer, for said at least one network variable referenced in the said customer-defined view definition file; and
generating a network data collection configuration file customized to said customer-defined view definition file based on said at least one network variable derived from said nodes associated with the corresponding customer, wherein the generated network data configuration file is usable in directing a network data collector to collect network data in accordance with the customer-defined view definition file.

31. The computer-readable storage medium of claim 30, wherein determining which nodes in the network are associated with the corresponding customer comprises:
querying a customer-node database that stores information identifying which nodes in the network are associated with each of a plurality of customers for said nodes associated with said corresponding customer.

32. The computer-readable storage medium of claim 30, wherein deriving said at least one network variable comprises:
deriving from the nodes associated with the corresponding customer said at least one network variable referenced in said customer-defined view definition file based on information received from a network device database that stores device-type information for nodes on the network.

33. The computer-readable storage medium of claim 30, wherein said at least one definition defines at least one performance metric of said at least one node associated with said corresponding customer.

34. The computer-readable storage medium of claim 30, wherein said plurality of customer-defined view definition files comprise extensible markup language (XML) formatted view definition files.

35. The computer-readable storage medium of claim 30, further comprising:
providing a global definition file that stores definitions for at least one of said at least one component of said at least one customer-defined view definition file, and wherein generating said network data collection configuration file further comprises:
receiving said definition for at least one of said at least one component from said global definition file.

36. The computer-readable storage medium of claim 30, wherein said network data collection configuration file is a Simple Network Management Protocol (SNMP) data collection configuration file.

37. The computer-readable storage medium of claim 30, further comprising:
providing a template file that stores at least one network data collection configuration file template; and receiving from said template file a network data collection configuration file template; and using said received template to generate said network data collection configuration file.

38. An apparatus, comprising:

means for determining which one or more nodes in a network are associated with a corresponding customer; and means for reading a customer-defined view definition file containing at least one definition of an aspect of the network to be viewed by a corresponding customer, wherein at least one of the at least one definition defines a calculation based on at least one component, and wherein at least one of the at least one component defines an expression involving collecting data associated with at least one network variable from at least one node associated with said corresponding customer;

means for deriving the nodes associated with the corresponding customer, values for said at least one network variable referenced in said customer-defined view definition file; and means for generating a network data collection configuration file customized to said customer-defined view definition file based on said at least one network variable derived from said nodes associated with the corresponding customer, wherein the generated network data configuration file is usable in directing a network data collector to collect network data in accordance with the customer-defined view definition file.

* * * * *